Figures 1, 2:
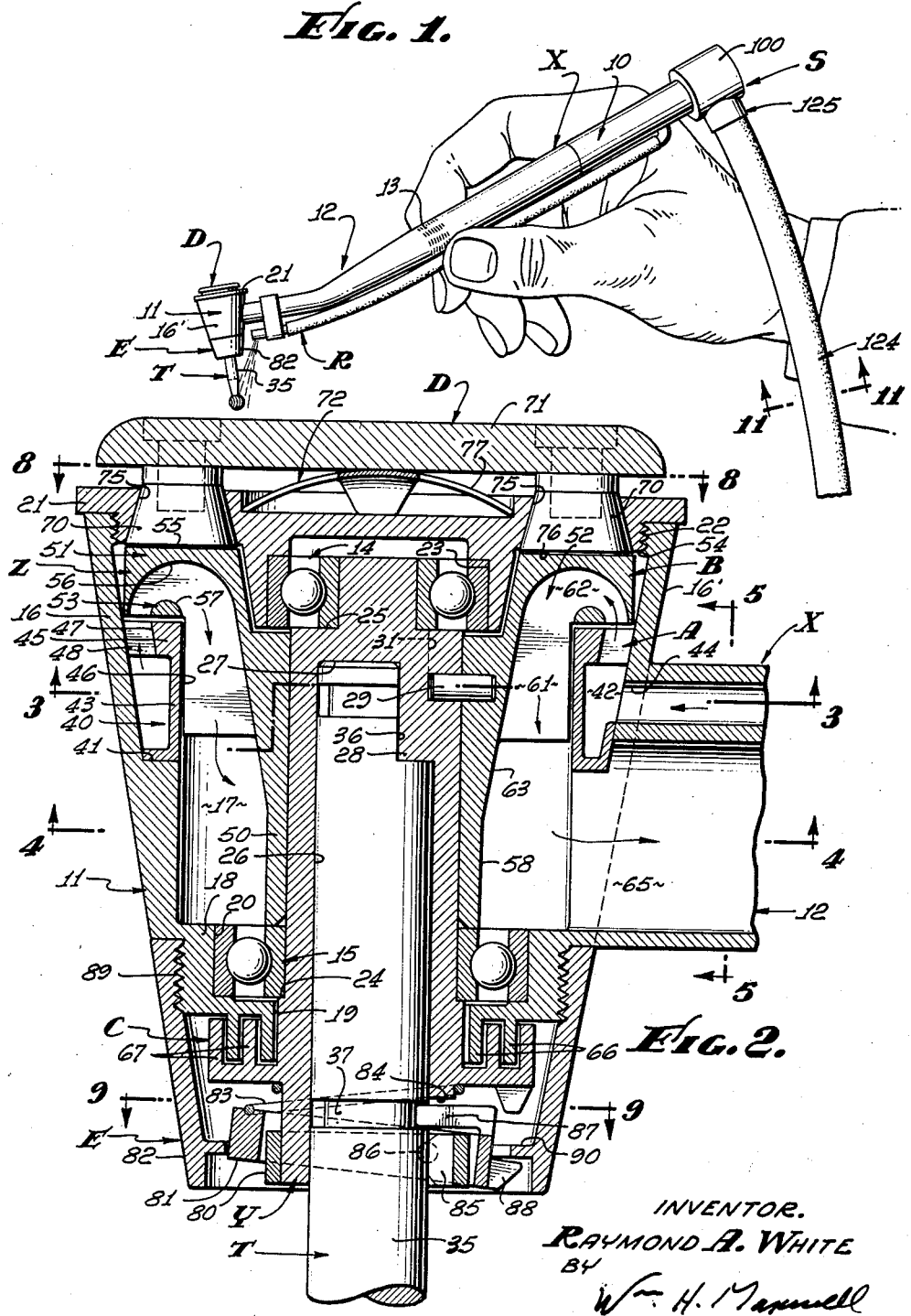

May 12, 1964 R. A. WHITE 3,132,426
TURBINE DRIVEN DENTAL HANDPIECE
Filed June 1, 1956 3 Sheets-Sheet 1

INVENTOR.
RAYMOND A. WHITE
BY
Wm. H. Maxwell
AGENT.

May 12, 1964  R. A. WHITE  3,132,426
TURBINE DRIVEN DENTAL HANDPIECE
Filed June 1, 1956  3 Sheets—Sheet 2
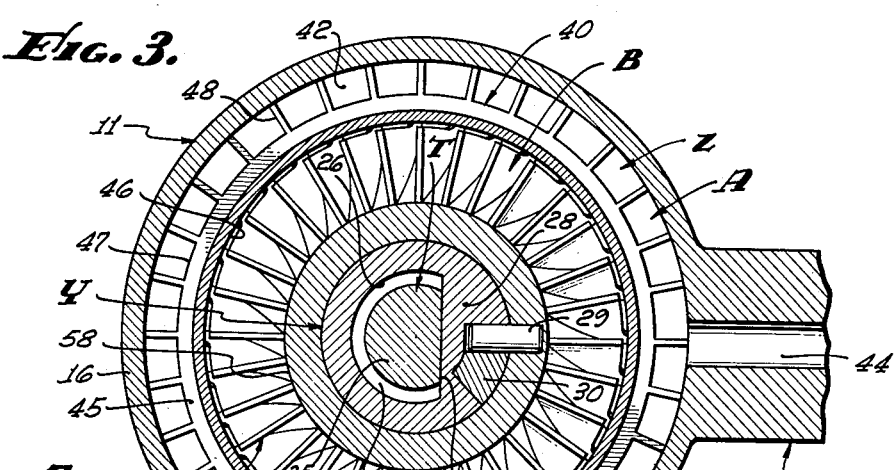
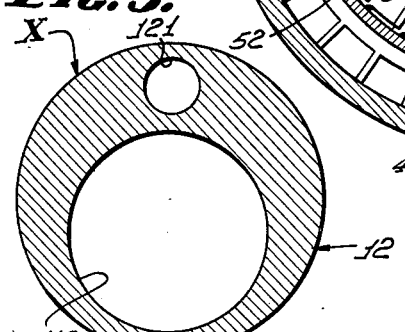
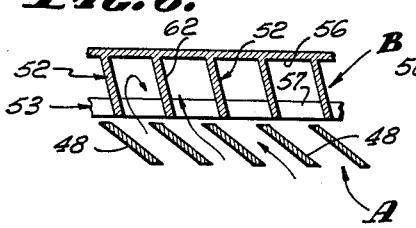
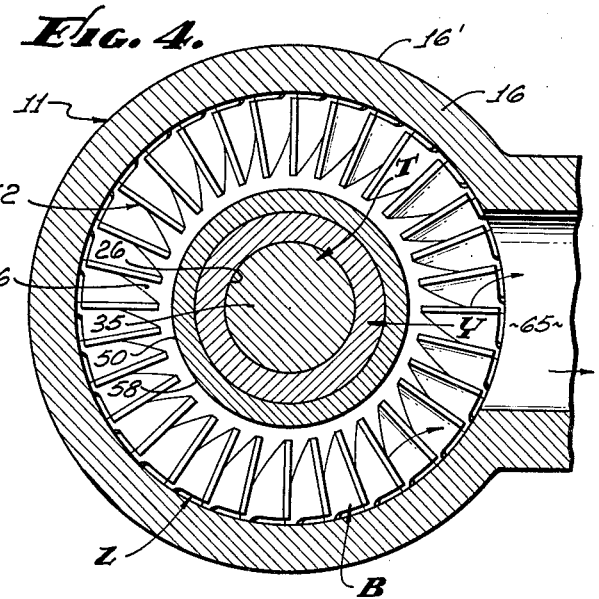
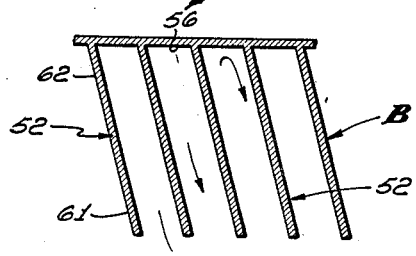
INVENTOR.
RAYMOND A. WHITE
BY
W. H. Maxwell
AGENT.

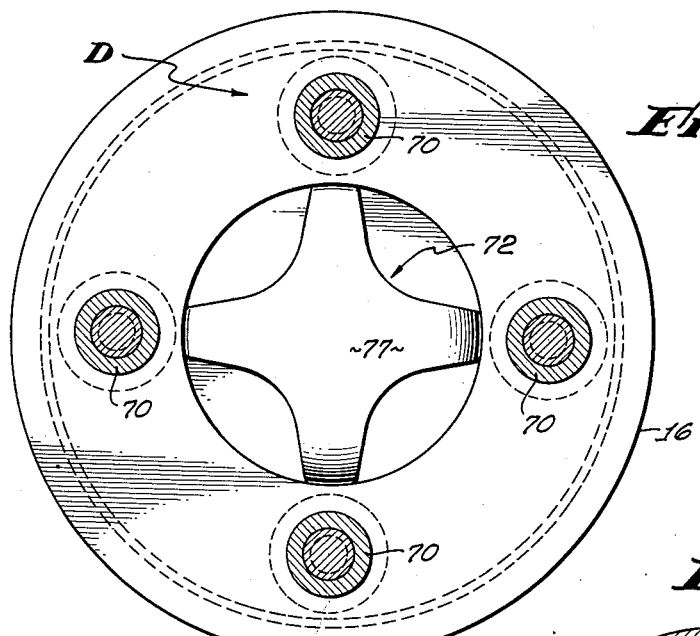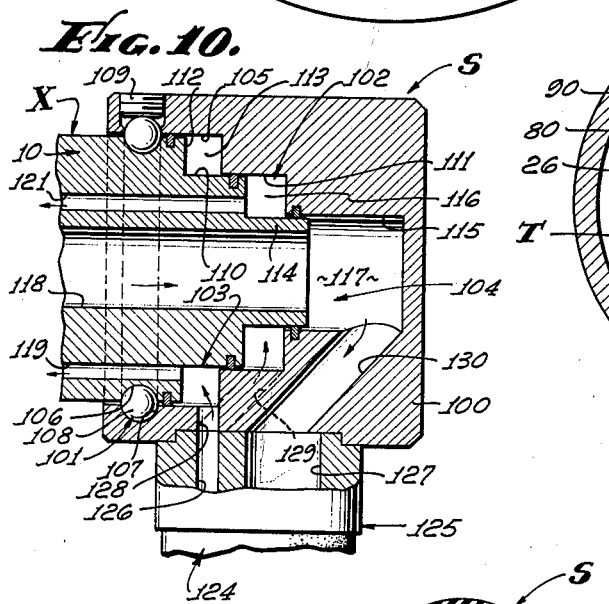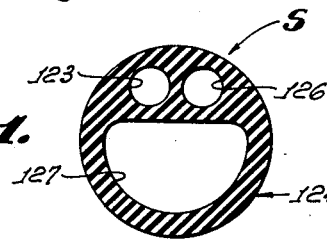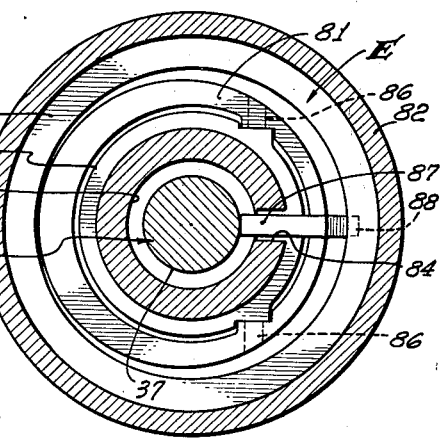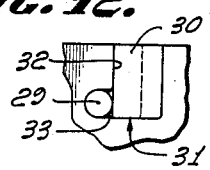

United States Patent Office 3,132,426
Patented May 12, 1964

3,132,426
TURBINE DRIVEN DENTAL HANDPIECE
Raymond A. White, 615 W. 9th St., San Pedro, Calif.
Filed June 1, 1956, Ser. No. 588,757
6 Claims. (Cl. 32—27)

This invention has to do with a turbine driven dental handpiece and is particularly concerned with a construction which affords motive power for driving a cutter carried by the handpiece, it being a general object of my invention to utilize compressed air for driving said cutter.

A dental handpiece is, in effect, a miniature industrial machine that is adapted to rotate and position a cutter, and consists of three basic elements, the handpiece body, the revolving cutter or tool, and the engine or motive power. The common handpiece involves a body that rotatably carries the tool and a driving motor that is remote from the body and tool. It is common to connect the motor to the rotatable tool to be driven thereby providing articulated arms that support pulleys over which the drive belt operates. Belt driven handpieces have limited movement and will not satisfactorily operate at the higher speeds of rotation that are presently required, and are subject to vibration, even at moderate speeds.

It is an object of my invention to provide a dental handpiece that is self-contained in that it includes the motive power for rotating the dental tool. The handpiece that I provide is easily manipulated, is compact and small in size, and is not cumbersome and is not subject to vibration during operation.

An object of this invention is to provide a fluid driven motor for a dental handpiece that can be incorporated in the head of the handpiece. With the motor that I provide the dental tool is driven directly without the use of a transmission, such as belts and the like.

It is another object of this invention to provide a high speed, high torque motor for a dental handpiece, which motor is small and light in weight. The motor that I provide employs the expansion of fluid, preferably compressed air, and the expansion of said fluid results in powering of the dental tool, and also has a cooling effect at the head of the handpiece.

It is still another object of this invention to provide means for braking rotation of the shaft that carries the dental tool. I have incorporated in the head of the handpiece a means that directly engages the rotating element to stop it from rotating in order to facilitate the application of the dental tool to the said shaft.

It is still another object of this invention to provide means for swivelly attaching a fluid supply to the body of a handpiece of the character above referred to, whereby the rotative position of the body is not affected by the position of the fluid supplying element or elements. The fluid supply and said means for swivelly attaching the said supply to the handpiece body may involve several fluid connections.

Still further, it is an object of this invention to provide a dental handpiece of the character above referred to that provides for exhausting of the expanded fluid to a remote point to avoid exhausting fluid at or near the head of the handpiece. With the structure that I provide, the expanded exhaust fluid is carried away from the handpiece via a flexible conduit.

An object of this invention is to provide a fluid supply and an exhaust handling means that is convenient and easy to handle. The means that I provide supplies a compressed fluid and handles the exhaust of the expanded fluid. Further, the said means provides for the supply of a coolant to be applied to the dental tool while it is rotated.

It is still a further object of this invention to provide a practical, easily manipulated dental handpiece that is reasonably inexpensive of manufacture, which operates efficiently at high speeds, and which produces a high torque without noise and without undue vibration.

The various objects and features of my invention will be fully understood from the following detailed description of a typical preferred form and application of my invention, throughout which description reference is made to the accompanying drawings, in which:

FIG. 1 is a perspective view of the dental handpiece that I have provided showing the manner in which it may be handled. FIG. 2 is an enlarged detailed vertical sectional view taken through the head of the handpiece shown in FIG. 1. FIGS. 3 and 4 are detailed transverse sectional views taken as indicated by lines 3—3 and 4—4 on FIG. 2. FIG. 5 is a sectional view taken as indicated by line 5—5 on FIG. 2. FIGS. 6 and 7 are diagrammatic sectional views of the stator and rotor involved in the structure and showing the manner in which the driving fluid is handled. FIGS. 8 and 9 are transverse sectional views taken as indicated by lines 8—8 and 9—9 on FIG. 2. FIG. 10 is an enlarged sectional view of a portion of the handpiece shown on FIG. 1. FIG. 11 is an enlarged sectional view taken as indicated by line 11—11 on FIG. 1, and FIG. 12 is an enlarged detailed view of a portion of the structure shown in FIG. 2 of the drawings.

The turbine driven dental handpiece that I have invented may be of the same general configuration as a common handpiece of the type under consideration. However, I have eliminated the cumbersome transmission involving pulleys and belts which ordinarily characterize these handpieces, and I have provided a unique engine which is driven by fluid that is delivered to the handpiece through a flexible tube or conduit. The dental handpiece shown in the drawings is a "contra-angle" handpiece wherein the axis of the head is at an angle to the axis of the handpiece body, preferably at about 60° thereto. It is to be understood, however, that the structure of the present invention is equally applicable to handpieces of any desired configuration, for example a straight handpiece.

As shown, the handpiece involves generally a body X, a tool driving shaft Y and an engine Z. The body is an elongated element adapted to be manipulated and the shaft Y is rotatably carried in the body and has an exposed portion adapted to receive the shank of a cutter or tool T. In accordance with the invention, the engine Z is housed within the body, preferably at and surrounding the shaft Y and provides the motive power for rotating the shaft Y and tool T. Further, the engine Z is preferably directly connected to the shaft Y, eliminating a transmission and resulting in reduced vibration and reduced power losses. In addition to the elements thus far referred to, the handpiece that I provide involves a coolant handling means R and a fluid handling means S for supplying and exhausting fluid from the body of the handpiece.

The elongate body X involves a rear handle portion 10 and a forward head portion 11. The handle portion 10 and head portion 11 are joined by an intermediate portion 12, and in the case of a contra angle handpiece the intermediate portion 12 is angular or bent so that the axis of the tool T is deflected from the central longitudinal axis of the handle portion 10. The handle portion 10 is a straight part with a round cylindrical outer wall knurled at 13 to provide a grip. The intermediate portion 12 is tapered forwardly and carries the head 11 which, in the case of the contra angle handpiece shown, is normal to the foremost end of the intermediate portion 12 and at an angle to the axis of the handle portion 10. In carrying out the invention, the head portion 11 is somewhat enlarged and is in the nature of a case for housing the shaft Y and engine Z as hereinafter described. The coolant distributing means R is supported by the body X and the fluid handling means S is carried by the rear end portion of the body X to receive and exhaust the fluids in the operation of the handpiece.

The tool driving shaft Y is rotatably carried in the head 11 on anti-friction bearings 14 and 15. The bearings 14 and 15 may be varied as circumstances require and as shown are ball-bearing units having inner and outer races with annular series of balls therebetween. In the preferred construction the head 11 has a circular wall 16 concentric with the axis of the head 11 and defining a chamber 17, the wall 16 being characterized by a downwardly and inwardly tapered exterior 16'.

The chamber 17 is closed at the lower end of the head 11 by a wall 18 in a plane normal to the axis of the head 11, there being an opening 19 to pass the shaft Y so that the shaft extends from the chamber 17 and projects from the lower end of the head 11. The lower bearing 15 is supported by the wall 18, the outer race of the bearing 15 being carried in a recess 20 in the wall 18 to be centrally seated in the head 11.

The chamber 17 is closed at the upper end of the head 11 by a removable closure 21 in a plane normal to the axis of the head 11 there being a releasable connection preferably in the form of screw threads 22 that join the closure 21 to the head 11. The upper bearing 14 is supported by the closure 21, the outer race of the bearing being carried in a recess 23 in the closure 21 to be centrally seated at the head 11.

The inner races of the bearings 14 and 15 engage and carry the shaft Y, there being an upwardly-faced shoulder 24 that engages the inner race of the bearing 15, and an upwardly faced shoulder 25 that engages the inner race of the bearing 14. The upper bearing is substantially smaller in diameter than the lower bearing and the shaft Y is stepped so that the shaft Y is insertable into operating position through the opening 19.

The shaft Y is rotatably supported in the head 11 by the spaced bearings 14 and 15 and is provided with a central bore 26 that enters the lower end of the shaft and terminates short of the upper end thereof. The bore 26 has a flat bottom 27 and a key or step 28 is provided at the bottom for driving engagement with the tool T hereinafter described. The shaft Y is held in operating position by means of a pin 29 held in place by a key 30 (see FIGS. 2, 3 and 12). A J slot 31 is provided in the side of the shaft Y adjacent to the step 28, and has a vertical portion 32 and a lateral portion 33. The pin 29 projects inwardly from the rotor of the engine, later described, the parts being proportioned so that portion 32 of the J slot passes the pin 29, and so that the shaft Y can be turned and the pin 29 entered into the lateral portion 33 of the J slot. When the pin 29 is in the latter position, the key 30 is put into place to occupy the portion 32 of the J slot 31. Thus the pin 29 and shaft Y are locked into working position.

The cutter of the tool T may vary widely and as a general rule involves the shank 35 adapted to fit into the bore 26 in the shaft Y. Some shanks are tapered, however I have shown a simple straight shank 35 that has a step 36 at the upper end thereof for driving engagement with the step 28 in the shaft Y. The shank 35 is also provided with a groove 37 to be engaged by a lock, later described.

The power means, or engine, Z, which I have provided utilizes fluid, preferably compressed air, for causing rotation of the shaft Y and the tool T carried thereby. The engine Z is connected directly to the shaft Y and, in fact, is supported by the shaft. As illustrated best in FIGS. 2 and 3 of the drawings, the engine Z involves generally a stator A and rotor B. The stator A is carried in a fixed position in the head 11, while the rotor B is carried on the shaft Y to be rotatable relative to the stator A. The stator A and rotor B occupy a portion of the chamber 17, preferably the upper end portion thereof, the lower end portion of the chamber 17 being left for the handling of fluid.

A ring 40 is provided to receive the fluid supply and to carry the stator A. The ring 40 in effect divides the chamber 17 into upper and lower portions and is supported by a ledge 41 provided at the inner side of the wall 16 intermediate the ends of the head 11. The ring 40 engages the inner side of the wall 16 and is provided with an outwardly opening or radially opening channel 42 that receives fluid delivered through a port 44 in the wall 16 of the head 11. There is a wall 43 at the inner diameter of the ring 40 which forms the bottom of the channel 42 and which surrounds the rotor B with working clearance.

The stator A is carried by the ring 40 above described and involve a plate 45 having a central bore 46 coincidental with the inner diameter of the ring 40. Further, the plate 45 forms the upper wall or the side of channel 42. The plate 45 is characterized by an annular wall 47 of the limited vertical extent, and which is substantially parallel with the inner side of the wall 16. In accordance with the invention an annular series of vanes 48 project radially from the wall 47 and extend between the wall 47 and the inner side of the wall 16. The vanes are pitched as shown in FIG. 6 of the drawings, the angle of pitch being varied as circumstances require. The vanes and related walls in effect form nozzle openings for directing the fluid in the desired direction prior to the fluid acting or reacting against the rotor B.

The rotor B is rotatably carried by the shaft Y above described and involves a hub 50, a wheel 51, an annular series of vanes 52 and a flow directing ring 53. The hub 50 is carried by the shaft Y when the shaft is in working position and is locked therein by the pin 29 as above described. Note that the pin 29 is carried by the hub 50 to project inwardly. The hub 50 is a tubular element slideably engaged over the shaft Y and the wall 51 extends outwardly from the hub 50 at the upper end thereof adjacent the underside 54 of the closure 21. In accordance with the invention the wall 51 is shaped to advantageously direct the flow of fluid so that it is particularly effective in driving the rotor B.

The wall 51 has a flat peripheral upper face 55 in a plane normal to the rotor axis and is engaged with the braking means later described. The wall 51 also has a curved peripheral lower face 56 adapted to receive flow of fluid from the stator A and to direct said flow of fluid inwardly and then downwardly to flow axially of the rotor B. As shown, the face 56 is a continuous annular face that is concave in cross-section and extends upwardly and inwardly from the periphery of the face 56 and then extends inwardly and downwardly to merge with the outer diameter 58 of the hub 50. The face 56, in effect, forms the outer wall of a flow passage 60 that directs the flow of and controls the expansion of the driving fluid.

The flow-directing ring 53 is provided to form an inner wall of the flow passage 60 for directing the flow and expansion of fluid. The ring 53 is a continuous annular element convex in cross-section, opposing the face 56, and extending between the wall 47 and the inner wall 43 of the ring 40. The outer face 57 of the ring 53 and the face 56 are divergent in the direction of the flow of the fluid and provide for the expansion of said fluid delivered from the stator A.

The vanes 52 carried by the rotor B project radially therefrom and are adapted to receive the action of the flow of fluid from the stator A and to cause reaction. As shown the vanes 52 are flat web-like parts that occupy the passage 60 by extending between the faces 56 and 57. In the preferred form of the invention, the vanes 52 have axially extending lower portions 61 in the plane of the upper portion 62. That is, both the upper and lower portions of the vanes 52 are in a common plane. In accordance with the invention, the said planes of the vanes 52 are pitched to extend downwardly and rearwardly from the direction of rotation, the angle depending upon the various factors involved, for example, the fluid pressure and the speed of rotation required.

As illustrated, the nozzles formed by the stator A direct the fluid upwardly and circumferentially in the direction of rotation, so that the fluid acts against the upper portion 62 of the vanes 52. The fluid is expanded by reason of the configuration of the passage 60 and the fluid flows inwardly and then downwardly along the hub 50. The hub 50 has a downwardly and inwardly tapered portion 63 that is divergent from the bore 46 so that the fluid continues to expand. Expansion of fluid as it flows along the inclined lower portion 61 of the vanes 52 causes reaction. The above described action and reaction of fluid moving over the vanes 52 results in rotation of the rotor B to the end that the shaft Y and tool T are rotated. Fluid discharged from the lower end of the vanes 52 enters the lower portion of the chamber and is exhausted through an enlarged lateral port 65 in the wall 16.

In order to prevent leakage from the lower end of the head 11 through the opening 19 in wall 18 I have provided a sealing means C. I prefer to employ a labyrinth type seal in order to avoid friction. Since the shaft Y is put into working position axially of the head the means C preferably involves overlapping axially disposed parts, preferably concentric ring-shaped parts. There are rings 66 depending from the wall 18 and there are upwardly projecting rings 67 carried by the shaft Y and overlying the rings 66. It will be apparent how the labyrinth seal effectively acts to prevent leakage from the lower end of the head 11.

The braking means D that I provide is carried at the upper end of the head 11 and is exposed at the exterior of the head for manipulation, and enters the head to engage the upper face 55 of the rotor B. The means D frictionally engages the rotor and involves brake blocks 70, and operator 71, and a return means 72. There may be a plurality of blocks 70 and each is shiftably carried in an opening 75 in the closure 21. The blocks 70 and openings 75 are preferably tapered to prevent upward movement of the blocks and the blocks are provided with flat shoes or faces 76 and engageable with the face 55 when the blocks are lowered or manually depressed. A single operator 71 is provided to control action of the blocks 70 and is preferably a disc-shaped part that overlies the top of the head 11. The operator 71 is carried by the blocks 70 which project through the closure 21 and the return means 72 yieldingly urges the operator 71 upwardly to normally draw the blocks 70 away from the face 55. The return means 72 may be any suitable pressure-exerting means, for example a spring 77.

The tool lock E that I provide is carried at the lower end of the head 11 below the wall 18 and releasably holds the cutter or tool T in position in the shaft Y. The lock E shown in FIGS. 2 and 9 of the drawings involves a base 80, a lever 81, an operator 82 and a return means 83. The base 80 is carried over the lowermost end portion of the shaft Y and is a ring-shaped element that is carried by and surrounds the shaft. The shaft has a side opening 84 in the nature of a slot and the base 80 is provided with a lug 85 having a keyed engagement in the opening 84 to position the base.

The lever 81 is pivotly carried by the base 80 on trunnions 86 that are on a horizontal axis offset laterally from the vertical axis of the shaft Y. The lever 81 is preferably a yoke-shaped part which surrounds the base 80 and the shaft Y, and is of greater mass or weight at the side thereof opposite the axis of the trunnions 86. As shown in FIG. 2 of the drawings, the lever 81 is normally at an angle to a horizontal plane, the side of greater mass being somewhat higher than the side at which the lever is pivoted. The side of the lever that is pivoted has a stop 87 and a lug 88. The stop 87 projects inwardly to releasably engage the tool T by entering the groove 37 above described. The lug 88 projects outwardly to be depressed by the operator 82.

The operator 82 is manually engaged and is adapted to shift downwardly to depress the lock 88 to thereby tilt or rock the lever 81. It will be apparent that the shifting of the operator and rocking of the lever 81 will withdraw the stop 87 from the channel or groove 37. As shown, the operator 82 may be a sleeve threadedly engaged on the lower end portion 89 of the head 11. An inwardly projecting flange 90 is provided to engage with the lug 88. The return means 83 yieldingly urges the weighted end of the lever 81 downwardly in order to normally maintain the stop 87 in the channel 37 in the tool T. As the shaft Y is rotated, the weighted end of the lever 81 tends to move downwardly pressing the stop into engagement with the tool. Turning of the operator 82 acts to withdraw the stop 87 from the channel 37, thereby releasing the tool T.

The fluid handling means S provides for the supply and exhaust of fluid to and from the body X of the handpiece and involves generally a cap 100 means 101 rotatably securing the cap to the handle portion 10 of the body X, means 102 supplying fluid under pressure to the body X, means 103 supplying coolant fluid to the body X, and means 104 exhausting fluid from the body X. The means S is best illustrated in FIG. 10 of the drawings, the cap 100 thereof being rotatably engaged over the rear end of the handle portion 10. The cap 100 has a bore 105 entering the forward end thereof, and the rear end portion of the handle portion 10 is engaged in said bore. The means 101 rotatably securing the cap 100 to the body X is an antifriction means and involves opposed annular channels 104 and 107, and a series of balls 108 engaged in and between the channels. The channel 106 is formed in the handle portion 10, while the channel 107 is formed in the cap 100, there being a plug 109 for closing a passage provided for entering the balls into working position. It will be apparent that the cap 100 is thus free to swivel on the body X.

The means 102 for supplying driving fluid to the body X involves a projection 110 of reduced diameter that extends from the rear of the handle portion 10 and which is engaged with a counter-bore 111 in the cap 100. The bottom of the bore 105 is spaced from the rear end 112 of the handle portion 10, thus forming an annular chamber 113.

The means 103 for supplying coolant fluid to the body X involves a second projection 114 of reduced diameter that extends from the rear of the projection 110 and which is engaged in a second counter-bore 115 in the cap 100. The bottom of the counter-bore 111 is spaced from the rear end of the projection 110, thus forming an annular chamber 116. Suitable seals are provided to prevent flow of fluids between the said chambers.

The means 104 for exhausting fluid from the body X involves an extension of said second counter-bore 115 forming a closed chamber 117, centrally located in the cap 100. The chamber 117 is in communication with a central passage 118 that passes through the body X and to the port 65 in the wall 16. The chamber 116 is in communication with a passage 119 that passes through the body X and to a fitting not shown. The fitting is provided as circumstances require to supply fluid to the coolant handling means R. The chamber 113 is in communication with a passage 121 that passes through the body X and to the port 44 in the wall 16.

In accordance with the invention, the chambers 113, 116 and 117 are in communication with the laterally extending tubes or conduits 123, 126 and 127 respectively as shown in FIGS. 10 and 11. A multi-tubular element 124 is provided and joined to the cap 100 by a suitable connector 125. Ports 128, 129 and 130 are provided in the cap to join the said chambers to the said conduits. The tubular element 124 is preferably extruded of flexible material so that the position thereof has little or no effect upon the position of the handpiece.

From the foregoing it will be apparent that I have provided an extremely compact dental handpiece of the character referred to which is convenient to handle and manipulate into any desired position. With the handpiece that I have provided there is no restriction as to position and the fluids handled thereby operate to drive the tool T to any desired speed, including extremely high speeds. The fluid that I prefer to employ in driving the handpiece of the present invention is compressed air which may be supplied from any suitable reservoir or pump. In practice, an oil mist may be atomized into the compressed air as it is delivered to the handpiece to the end that the entire structure is internally lubricated when in operation. It is to be observed that the means that I provide for exhausting expanded air is extremely desirable and renders use of the handpiece very comfortable to the patient being worked upon. From FIGS. 3 and 4 of the drawings it will be observed that the rotor and shaft will turn in a clockwise direction, however, it will be understood that the direction of rotation may be reversed if so desired.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A fluid driven dental handpiece of the character described, including, a body having a handle portion, a tool driving shaft rotatably carried by the body at one end thereof, a fluid driven engine carried in the body and connected to rotate the shaft, and fluid handling means at the other end of the body including, a cap freely rotatable on the body, a chamber in the cap, a passage in the body between the chamber and the engine, and a fluid handling duct in communication with said chamber.

2. A fluid driven dental handpiece of the character described, including, a body having a handle portion, a tool driving shaft rotatably carried by the body at one end thereof, a fluid driven engine carried in the body and connected to rotate the shaft, and fluid handling means at the other end of the body including, a cap rotatably secured to the body, a plurality of chambers in the cap, a plurality of passages in the body, and fluid handling ducts extending from the cap and in individual communication with the chambers.

3. A dental handpiece of the character described, including, an elongate body having a handle portion and a head, a tool driving shaft rotatably carried in the head, an engine carried in the head and having a driving element connected directly with the shaft, and a brake means engageable with a part on the shaft and including, an operator at the exterior of the head, and a block to be shifted by movement of the operator to frictionally engage said part.

4. A dental handpiece of the character described, including, an elongate body having a handle portion and a head, a tool driving shaft rotatably carried in the head, an engine carried in the head and including, a stator supported by the head and a rotor supported by the shaft and directly driving said shaft, and a brake means engageable with the rotor and including, an operator at the extension of the head, and a block to be shifted by movement of the operator to frictionally engage the rotor.

5. A dental handpiece of the character described, including, a body having a handle portion, a tool driving shaft rotatably carried by the body, an engine for rotating the shaft, and a lock for retaining a tool in the shaft including, a lever pivotally carried on the shaft to extend transversely thereof at an angle thereto, the lever having a stop adapted to lock with the tool, and the lever having a weight positioned to move the lever to engage the stop with the tool when the shaft is rotated.

6. A dental handpiece of the character described, including, a body having a handle portion, a tool driving shaft rotatably carried by the body, an engine for rotating the shaft, and a lock for retaining a tool in the shaft, including, a lever pivotally carried on the shaft to extend transversely thereof at an angle thereto, the lever having a stop adapted to lock with the tool and having a weight positioned to move the lever to engage the stop with the tool when the shaft is rotated, and a sleeve shiftable on the head and adapted to move the lever to release the tool.

References Cited in the file of this patent

UNITED STATES PATENTS

| | | |
|---|---|---|
| 1,878,747 | Youngblood | Sept. 20, 1932 |
| 2,180,993 | Monnier | Nov. 21, 1939 |
| 2,435,042 | Johansson | Jan. 27, 1948 |
| 2,886,285 | Buck | May 12, 1959 |
| 2,910,005 | Angell et al. | Oct. 27, 1959 |

FOREIGN PATENTS

| | | |
|---|---|---|
| 378,764 | France | Aug. 22, 1907 |
| 855,304 | Germany | Nov. 13, 1952 |